United States Patent
Schreiber

(10) Patent No.: US 8,480,344 B2
(45) Date of Patent: Jul. 9, 2013

(54) CONVEYING APPARATUS FOR OBJECTS AND WELDING APPARATUS WITH SUCH A CONVEYING APPARATUS

(75) Inventor: Peter Schreiber, Bargen (CH)

(73) Assignee: Soudronic AG, Bergdietikon (CH)

( * ) Notice: Subject to any disclaimer, the term of this patent is extended or adjusted under 35 U.S.C. 154(b) by 0 days.

(21) Appl. No.: 13/565,070

(22) Filed: Aug. 2, 2012

(65) Prior Publication Data

US 2012/0292157 A1 Nov. 22, 2012

Related U.S. Application Data

(62) Division of application No. 11/872,223, filed on Oct. 15, 2007, now Pat. No. 8,235,202.

(30) Foreign Application Priority Data

Oct. 16, 2006 (CH) .................................. 1640/06
May 30, 2007 (CH) .................................. 0861/07

(51) Int. Cl.
*B21D 51/28* (2006.01)

(52) U.S. Cl.
USPC .......... 413/72; 198/473.1; 198/575; 198/614; 198/717; 228/151

(58) Field of Classification Search
USPC .............. 198/575, 473.1, 717, 576, 577, 613, 198/614; 228/151; 219/79, 604; 413/69, 70, 413/71, 72, 73, 74, 75, 76, 77
See application file for complete search history.

(56) References Cited

U.S. PATENT DOCUMENTS

| 908,373 | A | * | 12/1908 | Ayars ............................. 228/11 |
| 2,791,978 | A | * | 5/1957 | Geertsen et al. .................. 228/9 |
| 3,862,563 | A | * | 1/1975 | Fencl et al. ...................... 72/403 |
| 3,881,721 | A | * | 5/1975 | Hitch .............................. 271/184 |
| 3,929,219 | A | * | 12/1975 | Malcolm ....................... 198/571 |
| 3,934,324 | A |   | 1/1976 | Hess et al. |
| 4,149,638 | A | * | 4/1979 | Nylund et al. ............... 198/406 |
| 4,162,382 | A |   | 7/1979 | Schalch |
| 4,354,086 | A |   | 10/1982 | Opprecht |
| 4,399,343 | A | * | 8/1983 | Muller et al. ................... 219/64 |

(Continued)

FOREIGN PATENT DOCUMENTS

DE 36 19 021 A1 12/1987
JP 9-2633 1/1997

OTHER PUBLICATIONS

Swiss Search Report for Application No. 0861/07.
European Search Report for EP 07020002.

*Primary Examiner* — Joseph A Dillon, Jr.
(74) *Attorney, Agent, or Firm* — McCormick, Paulding & Huber LLP

(57) ABSTRACT

A conveying apparatus with a first conveyor and a second conveyor is used a the welding apparatus and a welding method for container bodies and in particular can bodies between which conveyors the object to be welded is handed over. A control unit determines the take over position and/or the conveying travel of the second conveyor and controls the conveyors accordingly, so that the take over occurs at the determined position and/or with the determined conveying travel of the second conveyor. This allows an easy and swift changing of the welding apparatus to different sizes of the objects to be welded.

9 Claims, 5 Drawing Sheets

U.S. PATENT DOCUMENTS

| | | | | |
|---|---|---|---|---|
| 4,417,117 A | * | 11/1983 | Opprecht | 219/64 |
| 4,497,995 A | * | 2/1985 | Nilsen | 219/121.63 |
| 4,589,541 A | * | 5/1986 | Lisec | 198/468.4 |
| 4,610,886 A | * | 9/1986 | Buller-Colthurst | 426/233 |
| 4,799,585 A | | 1/1989 | Gysi | |
| 4,815,581 A | | 3/1989 | Deutschlander | |
| 4,824,007 A | * | 4/1989 | Depaoli et al. | 228/102 |
| 4,982,556 A | * | 1/1991 | Tisma | 53/506 |
| 5,123,638 A | * | 6/1992 | Mutou | 271/187 |
| 5,158,277 A | * | 10/1992 | Reist | 271/266 |
| 5,497,935 A | | 3/1996 | Gravier | |
| 6,302,262 B1 | * | 10/2001 | Maeder | 198/465.4 |

* cited by examiner

CONVEYING APPARATUS FOR OBJECTS AND WELDING APPARATUS WITH SUCH A CONVEYING APPARATUS

CROSS REFERENCE TO RELATED APPLICATIONS

This application is a divisional of U.S. patent application Ser. No. 11/872,223, filed Oct. 15, 2007, and claims the benefit of priority of Swiss Patent Application No. 1640/06, filed Oct. 16, 2006, and of Swiss Patent Application No. 0861/07, filed May 30, 2007, the disclosures of which are herein incorporated by reference in their entirety.

BACKGROUND OF THE INVENTION

The invention relates to a conveying apparatus for the conveying of objects from a first station to a working station, comprising a first controllable conveyor with a first conveying path, a second controllable conveyor with a second conveying path, wherein the first conveying path and the second conveying path partly align and an object conveyed by the first conveyor can be taken over by the second conveyor at a take over position within the aligning zone of the conveying paths, and a control unit connected to the controllable drives of the conveyors. The invention further relates to a welding apparatus including such a conveying apparatus and still further relates to a welding method.

Such apparatus are for example used for can body making. The rounded but not yet welded can bodies are output from a rounding apparatus and then conveyed by the first conveyor in direction of the can body welding station. The objects or the not yet welded can bodies, respectively, are delivered with a delivery speed for the taking over by the second conveyer to the take over zone and handed over therein to the second conveyor. The second conveyor transports the can bodies into the welding station. Known conveyors for this work are provided with a crank drive or with a multi linkage system which acceleration and speed is dependent of the feed rate of the conveyed bodies and which conveying stroke length is essentially constant. The second conveying apparatus hands the can bodies over to the welding station with a speed that essentially equals the welding speed of the welding station. The transport means of the welding station transport the bodies with constant welding speed through the welding station and at the same time the axially aligned edges of the bodies are welded. During welding a very small distance between bodies following each other is necessary for high welding quality and the welding speed is usually less than the delivery speed of the second conveyor and at the most equals the delivery speed of the second conveyor.

The handing over of a body from the first conveyor to the second conveyor is usually effected by a conveying dog of the second conveyor that contacts the body from behind and accelerates the body, pushing it along the taking over path and, after the short acceleration, decelerating the body which is then taken over by the transport of the welding station while the conveying or taking over dog, respectively, returns to its starting point for taking over of the next body.

With a prior art conveying apparatus and welding apparatus, respectively, considerable changeover work is necessary when the size of the objects changes (which is the can body height in case of can bodies that are conveyed while lying horizontal). To this end the position of the first conveyor has to be adapted each time body height changes to the new body height which is very time consuming.

BRIEF SUMMARY OF THE INVENTION

An object of the invention is to avoid the mentioned drawback.

According to a first aspect of the invention the control unit is adapted to determine the take over position or it is adapted to receive an externally determined take over position, and the take over by the conveyors T1 and T2 is controlled during operation of the conveying apparatus by the control unit such that the handing over is effected at the determined position.

By the feature that the control unit determines the take over or handing over position, or that the control unit can use an externally determined take over or handing over position that is input into the control unit, and the control unit then controls the first and the second conveyor accordingly, so that the actual handing over position is equal to the determined handing over position, it is possible to adapt the apparatus to a change of object size within a certain range in a very convenient manner without necessitating a change of position or change of distance, respectively, of the first conveyor to the welding station. The determination of the handing over position is done in particular dependent on the length of the object in conveying direction and is thus done for can bodies that are conveyed horizontally depending on the can body height. The conveying travel of the second conveyor can be kept constant for a large range of can body heights under this aspect of the invention.

In a further aspect, the invention also solves the problem by providing the second conveyor with a linear conveying unit that can be controlled by the control unit to provide a variable conveying travel.

This allows as well to keep the position of the first conveyor constant (and thus avoids the time consuming changeover) for a large range of can body heights and the adaptation of the conveying apparatus to different object sizes or can body heights, respectively. Thus adaptation to changing container size is done by changing and controlling the conveying travel of the second conveyor that inserts the object into the welding machine while the taking over position remains essentially the same.

Both aspects of the invention can be provided alone or in combination. Thus it is possible on the one hand to determine a take over position for a body size or different take over positions for a different sizes and in case of a change in body size outside of these sizes to change the travel of the second conveyor that inserts the body into the welding machine. On the other hand it is possible to work with a travel of the second conveyor for a body size or a travel range for different sizes and to shift the take over position if other sizes of bodies shall be handled.

The welding apparatus for container bodies and in particular can bodies solves the problem by the features, that it comprises a rounding station for said bodies, a welding station having calibration tools and driven welding rollers, and a conveying apparatus for conveying said bodies from said rounding station into said welding station, wherein said conveying apparatus comprises a first controllable conveyor T1 with a first conveying path, a second controllable conveyor T2 with a second conveying path, and a control unit connected to the controllable drives of said first and second conveyors, wherein said conveying paths overlap partly in an overlapping zone and a container body conveyed by said first conveyor is taken over at a take over position in the overlapping zone of the paths by said second conveyor and wherein said take over position is determined by said control unit, or said control unit is arranged to use an externally determined take over position, and said take over is controlled by said control unit during operation of said welding apparatus so that said take over is effected at said determined take over position. For the welding apparatus as well it is possible to work according to the second aspect of the invention or with a combination thereof, as explained above. The second aspect for the welding apparatus is manifested by the features that the apparatus is adapted for welding container bodies, and in particular can bodies, and comprises a rounding station for said bodies, a welding station having calibration tools and driven welding rollers, and a conveying apparatus for conveying said bodies from said rounding station into said welding station, wherein said conveying apparatus comprises a first controllable conveyor T1 with a first conveying path, a second controllable conveyor T2 with a second conveying path, and a control unit connected to controllable drives of said first and second conveyors, and wherein said conveying paths overlap partly in an overlapping zone and a container body conveyed by said first conveyor is taken over at a take over position in the overlapping zone of the paths by said second conveyor and wherein said second conveyor comprises a linear conveying unit which is controlled by said control unit to effect a controllable variable conveying travel inserting said body into said welding station.

The method for welding can bodies is manifested as well by both aspects of the invention which may be used separately or in combination and the method for welding can bodies is thus manifested by the steps of transporting said bodies from a rounding station along a transport path to a welding station with calibration tools and driven welding rollers, dividing said transport path in two conveying paths by a first controllable conveyor T1 with a first conveying path, a second controllable conveyor T2 with a second conveying path, said conveyors being controlled by a control unit connected to controllable drives of said first and second conveyors, arranging said conveying paths to overlap partly in an overlapping zone, taking over a can body conveyed by said first conveyor at a take over position in the overlapping zone of the paths by said second conveyor, and wherein said take over position is determined by said control unit, or said control unit is arranged to use an externally determined take over position, and said take over is controlled by said control unit during operation of said conveying apparatus during welding of said can bodies, so that said take over is effected at said determined take over position and/or wherein said second conveyor comprises a linear conveying unit which is controlled by said control unit to effect a controllable variable conveying travel.

In a preferred embodiment of the conveying apparatus and the welding apparatus and the method, respectively, the control unit is adapted to determine the taking or handing over position from the length (BBH) of the object in the direction of transport, or on the other hand the control unit determines the conveying travel (X) dependent on the length (BBH) of the object in conveying direction.

In a further preferred embodiment of the conveying apparatus the first conveyor is provided with an electric servomotor drive driving chain conveyor means or belt conveyor means with conveying elements or dogs, respectively, arranged thereon, and the second conveyor is provided by a linear conveying unit that is in particular provided with only one conveying element driven thereby.

It is further preferred that the second conveyor comprises a lifting and lowering unit by which a conveying element, and in particular the single conveying element, of the second conveyor is controllably lifted or lowered at any position of the conveying path or travel, respectively, so that the taking over or handing over position can be freely selected within the conveying travel by lowering the conveying element for the take over, and the moment of travelling back of the dog can be selected freely as well by lifting, whereby the conveying element or dog, respectively, can travel back without touching the next conveyed object. It is preferred in this embodiment that the conveying element is displaceable by the linear unit along a linear guiding and that the linear guiding can be lifted and lowered by a lifting and lowering unit. The linear guiding may be arranged to be lifted and lowered as a whole and can be connected with a fixed element of the conveying apparatus by holding elements that can be elastically flexed or can bend with a joint. In another embodiment the conveying element is connected by holders, which can be flexed or bent, to a part of the linear conveying unit that can be moved linearly. As a flexible holder at least one leaf spring may be provided.

BRIEF DESCRIPTION OF THE DRAWINGS

The invention will be better understood and objects other than those set forth above will become apparent when consideration is given to the following detailed description thereof. Such description makes reference to the annexed drawings, wherein.

DETAILED DESCRIPTION OF THE INVENTION

Figure 1:
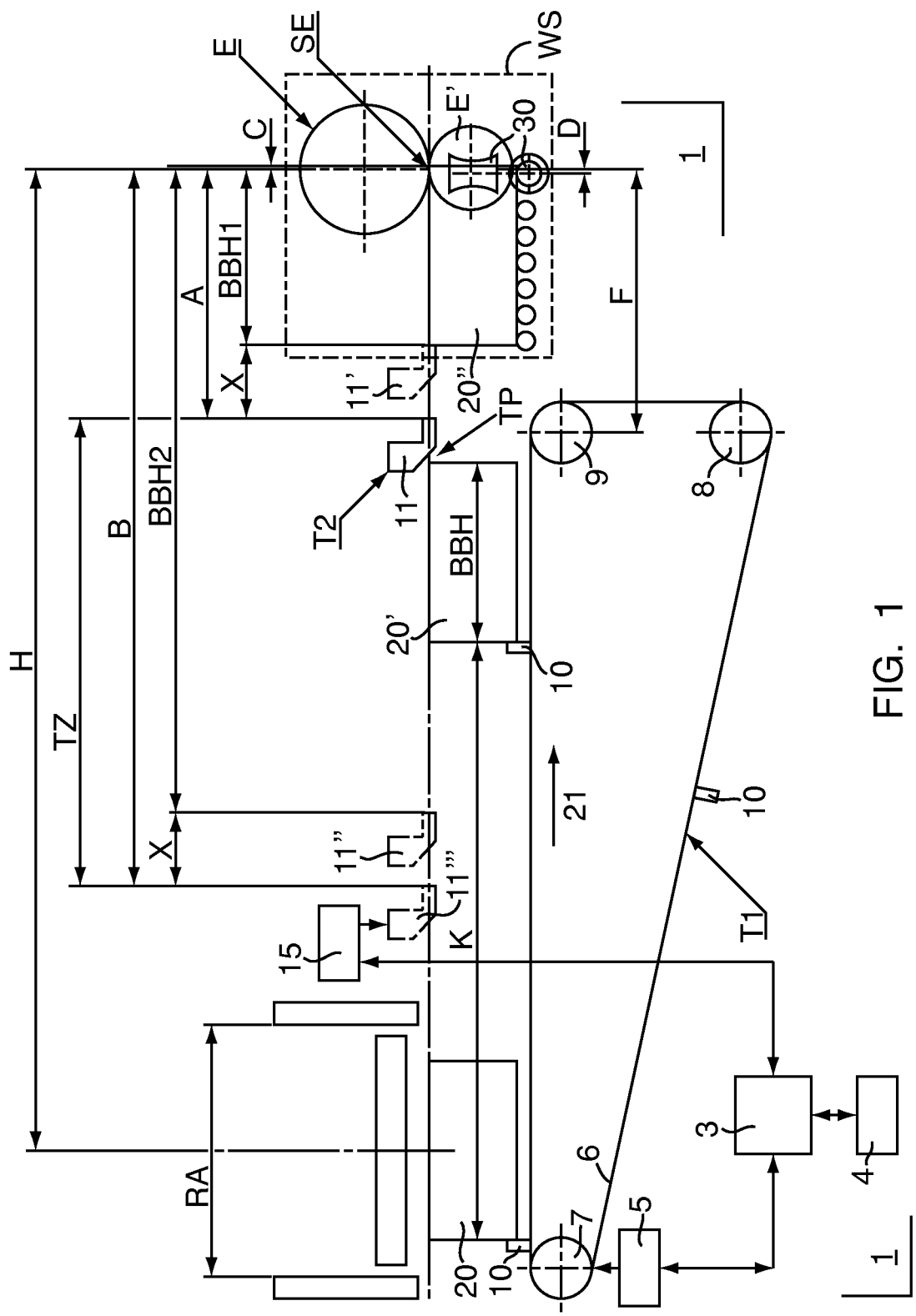
FIG. 1 is a schematic view of a welding apparatus with a conveying apparatus for the explanation of the first aspect of the invention.

FIG. 1 shows a welding apparatus for container bodies, and in particular can bodies, in a very schematic view. The welding apparatus 1 has a support for the elements mentioned below (only indicated by the two angles where the reference numerals 1 are placed) and is provided with a conveying apparatus according to the invention comprising the conveyors T1 and T2. Such a conveying apparatus could be used independently of the welding apparatus but is now described only in combination therewith. Further the welding apparatus 1 is provided with welding electrodes E and E' which are arranged on the upper and lower arm, respectively, of the welding station WS or welding machine, which arms are not shown in the drawing. A wire electrode may be used for welding, as is known to the man skilled in the art. Ahead of the welding plane, which is indicated by SE, a calibration tool is provided which is indicated in the drawing by the diabolo rollers 30 which tool is known to the man skilled in the art and which brings the welding object or the can body, respectively, into the correct position of its edges for the welding procedure. The body calibration is always provided in front of the welding plane SE and a distance D is shown in the drawing. The feeding of a can body to be welded into the welding apparatus is done by a conveyor T2 of which a conveying dog 11 is shown in different positions 11 to 11''' which will be explained in greater detail below. A first conveyor T1 conveys the object to be welded up to the takeover by the conveyor T2. In the shown example an object to be welded or the rounded can body, respectively, is provided at the output of a rounding station RA and is contacted there by the first conveyor with one of its conveying elements 10 and in particular by a conveying dog 10. In the shown example the conveying path of conveyor T1 is a linear path and as well the conveying path of conveyor T2 is a linear path. This can be different in other embodiments.

The first conveyor T1 is in a preferred embodiment a chain conveyor or a belt conveyor, having for example two parallel running chains or belts on which dogs or pairs of dogs are provided. The distance of such dogs or pairs of dogs, respectively, in conveying direction is shown as K in the Figure. The chains or belts 6 are driven by a drive 5. In the shown example the drive 5 drives the deflection roller 7. Further deflection rollers 9 and 8 are provided adjacent of the welding rollers and there define for conveyor T1 its distance F from the welding plane SE. Drive 5 is preferably an electric servomotor drive and is a drive that can be controlled by control unit 3 for starting and stopping and for its speed and if the case may be for its curve of speed over time. The control unit is provided preferably with an input means 4. The control unit can be provided by the usual industrial controllers or by a personal computer, which are both well known to the man skilled in the art. The control unit is provided with the necessary interface to control drive 5, which is as well known to the man skilled in the art. Such controllers and interfaces are commercially available.

The conveyor T1 thus takes over a rounded can body 20 which exits the rounding station RA and conveys it controlled by control unit 3 in direction of arrow 21 towards the welding machine WS and the welding electrode rollers E, E', respectively. A guide (not shown) adapted to guide the rounded body while being conveyed by conveyor T1 may be provided. The transport by conveyor T1 and the dogs 10 is provided until the conveying element 11 takes over the conveying of the can body. This taking over is done at a taking over position TP along an overlapping section TZ of the conveying paths of conveyor T1 and conveyor T2.

Conveyor T2 can be an endless controllable conveyor similar to conveyor T1. But it is preferred that conveyor T2 is a conveyor with a linear conveying unit, respectively, and in particular it is preferred that this linear unit comprises a single conveying element 11 that can be moved to and fro by the linear conveying unit. The corresponding drive is schematically shown with box 15 and is controlled as well by control unit 3. Linear conveying units are known to the man skilled in the art and are thus not explained in detail here since any linear unit that provides the linear movement of the conveying element 11 and that can be controlled can be used. Such linear conveying units are commercially available.

The control unit 3 controls the taking over or handing over, respectively, at the appropriate position TP from transport T1 to transport T2. This can be done in that control unit 3 calculates the appropriate position TP for taking over. To this end control unit 3 can be provided by using input means 4 to input the size of the object to be welded in conveying or transport direction, respectively. In the shown example this is the can body height BBH. By this size or can body height, respectively, and by the travel X provided by conveyor T2 the control unit can calculate the appropriate taking over position taking account of the known movements of T1 and T2. The take over position can as well be calculated on a separate computer and can be input into control unit 3 over the input means 4, such as a keyboard, or by a data connection of this external computer and control unit 3. In a further example the taking over position can be provided empirically by conveying sample can bodies of the desired height very slowly or stepwise by T1 and T2 and by thus detecting by observation the optimum take over position for this can body height at the given constant distance F of T1 from the welding plane SE and by inputting this visually detected take over position into control unit 3.

If, for the first aspect of the invention, a constant conveying travel X is provided by conveyor T2, and the minimum body height of BBH1 shall be handled up to the maximum body height BBH2 without moving conveyor T1 in relation to the welding plane (thus distance F is kept as it is despite a change in welded body size) so the take over position TP being nearest to the welding plane SE (for the minimum height bodies BBH1) is found at the position of the conveying element or dog 11, respectively, with the distance A (that equals BBH1+X) from the welding plane which is shown in the drawing by the dog 11 of T2 drawn in full line. On the other hand the take over position TP farthest away from the welding plane SE (for can bodies of maximum height BBH2) is shown by dog 11''' in broken line and with a distance B (that equals BBH2+X) from the welding plane. Depending on the body height between the values BBH1 and BBH2 a take over position TP results that is located between the positions given by dogs 11 and 11''', respectively. The man skilled in the art can easily detect how this take over position TP can be calculated dependent on the body height and the geometric proportions of the welding or conveying apparatus as shown or on another apparatus, or he can detect that the take over position TP can be found easily by a few trials with the desired body height. Accordingly the control unit will control the drives 5 and 15 by using this calculated or evaluated position value for the take over so that the dog 11 of transport T2 takes the body over from the dog 10 of transport or conveyor T1, respectively. The taking over can be done for example by slowing down conveyor T1 a bit and by taking the body over by a comparably higher speed of T2 and its dog 11 for inserting the body with conveyor travel X into the welding rollers. If on the other hand conveyor T1 is driven with a constant speed at the time of taking over by T2, this conveyor T2 will be driven with a higher speed than the speed of T1 for the taking over and will then decelerate along the travel X for meeting the insertion speed for the welding machine WS. In any case dog 10 of T1 will travel out of the conveying path by being deflected around roller 9.

As a preferred embodiment and an example of the above mentioned combination of the two aspects of the invention, it is further provided that if the minimum body height falls below BBH1, either the control unit 3, the external computer or the person that is empirically providing the setting, sets another, in this example a longer, conveying travel X of T2, so that a take over from T1 to T2 at the shown minimum takeover position at the distance A is possible even for a lower body height than BBH1. On the other hand if the maximum body height BBH2 is exceeded it is possible as well to adapt the conveying travel X of T2 which in this case is set to be shorter than before.

The speeds of the conveyors are selected according to the body height BBH, the dog distance K, the two conveyors T1 and T2 and the desired travel X for the insertion of the body into the welding machine and according to the production rate, i.e. the desired number of bodies welded over time. Here as well a calculation or an empirical setting can be found and stored in control unit 3. This needs no detailing here since such a calculation and/or empirical evaluation can be done by the man skilled in the art based on the shown geometrical properties of the welding and conveying apparatus. The control of the drives 5 and 15 is then selected such that the take over of the body will happen at the desired position. The liberty of movement given by the servo-motor drive 5 and the linear unit drive 15 allows the take over at the desired position. Here as well a slow movement or stepwise movement during evaluation of the desired movements will allow for an easy empirical determination.

Figure 2:
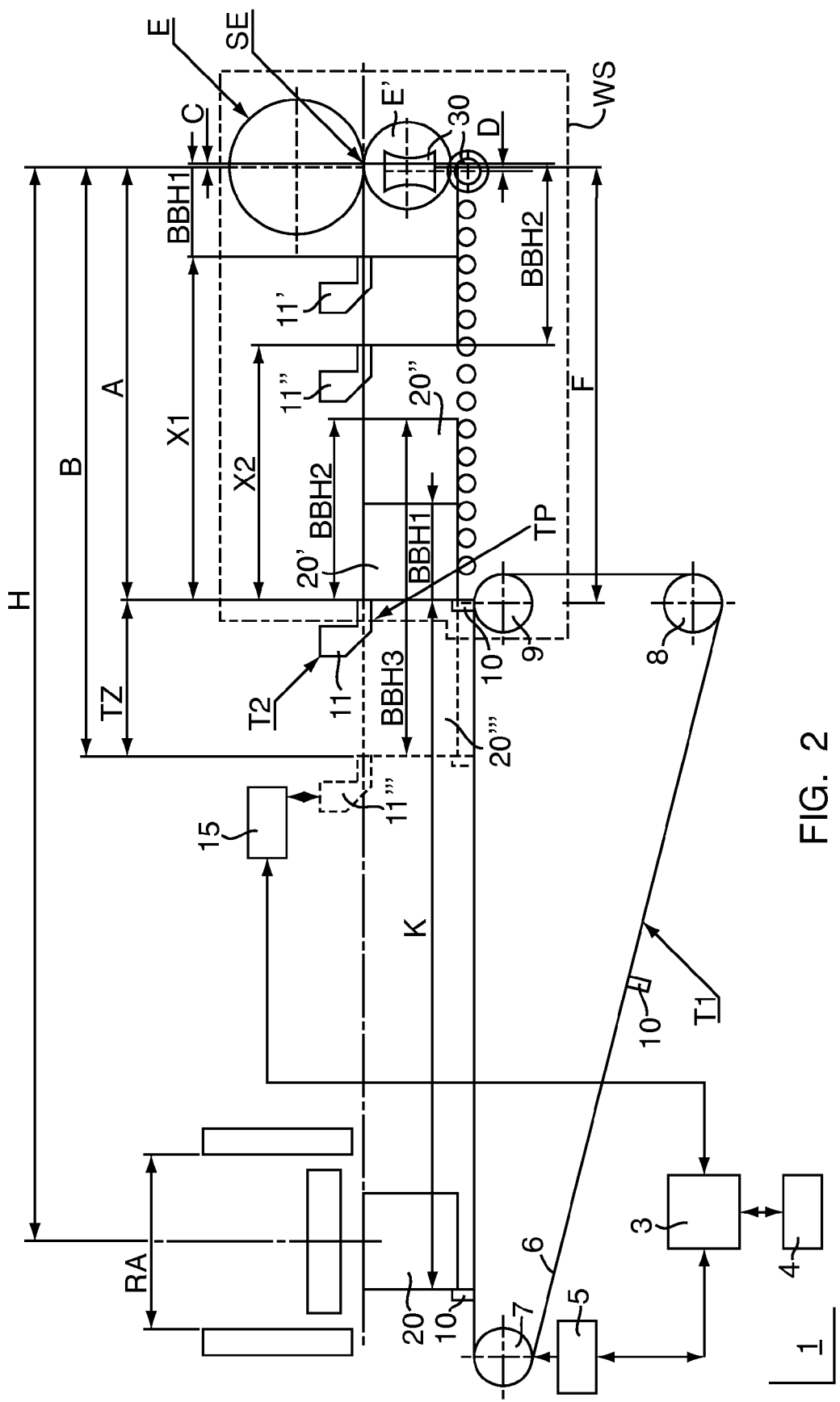
FIG. 2 is a schematic view of a welding apparatus with a conveying apparatus for the explanation of the other aspect of the invention.

FIG. 2 shows a further schematic view similar to FIG. 1 wherein same reference numerals as used before depict same elements. Here as well a welding apparatus for the making of can bodies is shown. The rounding station SA is arranged at a distance H to the welding plane SE. This distance can be a given constant distance or it may be set during an initial setting to the desired body height. In this example as well the actual body 20, 20' and 20" is transported by dogs 10 of the conveyor T1 to the take over position TP where the second conveyor T2 takes the body over by the conveying elements 11. In the shown embodiment the conveyor T2 is provided with a linear conveying unit and with a single conveying dog 11. The explanations given for the linear conveying unit of the embodiment of FIG. 1 apply here as well. The take over position TP for T1 to T2 is in this aspect of the invention usually kept constant and can be determined for this aspect with the longest body height BBH2 (can body 20") and the shortest conveying travel X2 of the conveyor T2 or the linear unit, respectively, as the starting values, which results in a take over position at the distance A from the welding plane SE. This taking over position can as well be determined by calculation or empirically. In FIG. 2 the take over position TP is shown as well with the conveying dog 11 and the body 20'. The taking over position can, depending on the body height, be in front of or (as shown) behind the centre of the deflection roller 9 of conveyor T1. In the second aspect of the invention explained by the example of this embodiment the taking over position remains essentially at the same place for different body heights but the conveying travel X of the conveyor T2 is varied dependent on the body height. This can be seen in FIG. 2 in that for the usually largest body height BBH2 and the body 20", respectively, the smallest usually used insertion travel or conveying travel X2 is provided. If the body height is the smallest of the usually used body heights BBH1, the insertion travel or conveying travel is made larger to the length X1. The maximum travel X1 is defined by the working speed of the apparatus and thus the time used per body, the maximum accelerations and speeds of the drives and the minimum body height. For the body heights in the range between BBH1 and BBH2 a conveying travel of T2 is accordingly selected that lies between X2 and X1. This can be calculated by the control unit 3 if the body height is given as input or the conveying travel can be given as the input directly via the input means 4. In this aspect as well it is possible to determine the conveying travel empirically by using sample bodies of the desired body height and a slow or stepwise operation of the apparatus.

In this embodiment as well it is in addition possible to shift the take over position of T1 to T2 in direction to the rounding apparatus if the body height BBH2 is exceeded and this is another example of the combination of the two aspects of the invention. This is shown in FIG. 2 by the body height BBH3 and a body 20''', respectively, which exceeds the usual maximum body height BBH2 and which is taken over at a taking over position shown by conveying dog 11''' and in the distance B from the welding plane SE. This allows it to forgo a time consuming adjustment of the conveyor T1 and the distance F, respectively, even for oversize can bodies. For such oversize can bodies 20''' the take over position is thus shifted as explained for the first aspect of the invention in connection with FIG. 1. It is thereby clear to the man skilled in the art that both aspects of the invention can be used together or completely separate, so that the features of claims 1 and 2 could be present in a single claim connected by an "and/or" clause. In the embodiment of FIG. 2 wherein the horizontal movement of conveyor T2 does not provide a constant conveyor travel but provides a variable conveyor travel by the linear conveying unit it is possible to keep the position of conveyor T1 constant with regard to the welding plane within a considerable range of body heights which may for example be a range of 50 millimeter up to 200 millimeter body height which can be handled by the variable conveyor travel of T2 only.

Figure 3:
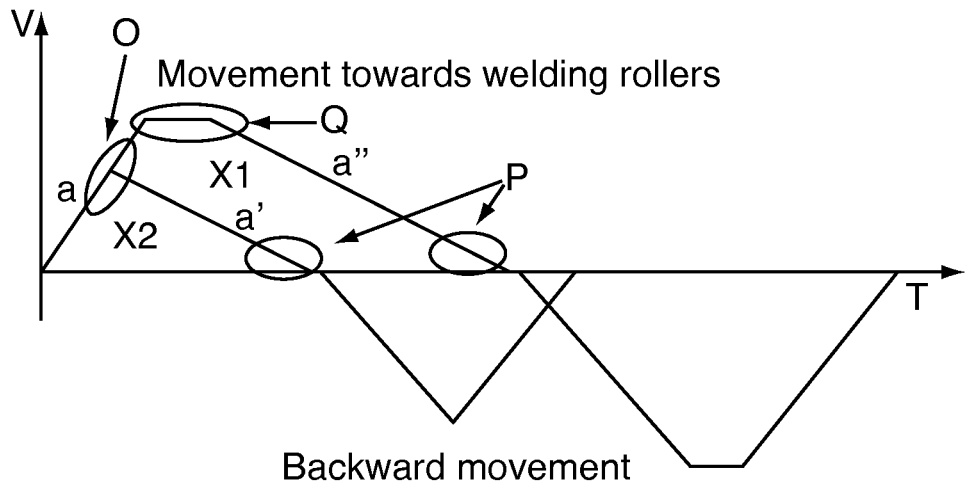
FIG. 3 is a diagram for showing different speed curves of the second conveyor.

FIG. 3 shows several different speed characteristics dependent on time t for the speed v of the conveying movement of conveyor T2. The acceleration a and the decelerations a' and a" and the speeds are selected such that they are usually the same or they are adapted to the production rate of the can bodies. The taking over of the body by the conveyor T2 occurs in the zone O and it is clear that the delivery speed of conveyor T1 shall be lower than the taking over speed of conveyor T2. The shapes for the speed in the area Q of the conveying travel can be selected differently, for example in the shape of a triangular profile, a trapezoidal profile, as a rounded curve, as a polynomial etc. The giving over of the body to the welding station occurs shortly before the end of the travel X1 or X2, respectively, or for travels in between in the area P of FIG. 3. The giving over speed to the welding machine is similar to the welding speed. The backward movement of the conveying dog of the conveyor T2 (with negative V value) is made with the maximum acceleration and speed of the linear unit. Here as well, different shapes are possible. In addition the conveying dog is lifted, which is explained below, so as to avoid a collision with the following can body. In the zone of the taking over position the conveying dog of the conveyor T2 is lowered before the taking over of the body by a lifting and lowering unit and the body is conveyed towards the welding machine as explained before. In the region of the end of the travel X of the dog the dog is lifted again and returned to the taking over region, where the cycle starts again.

Figure 4:
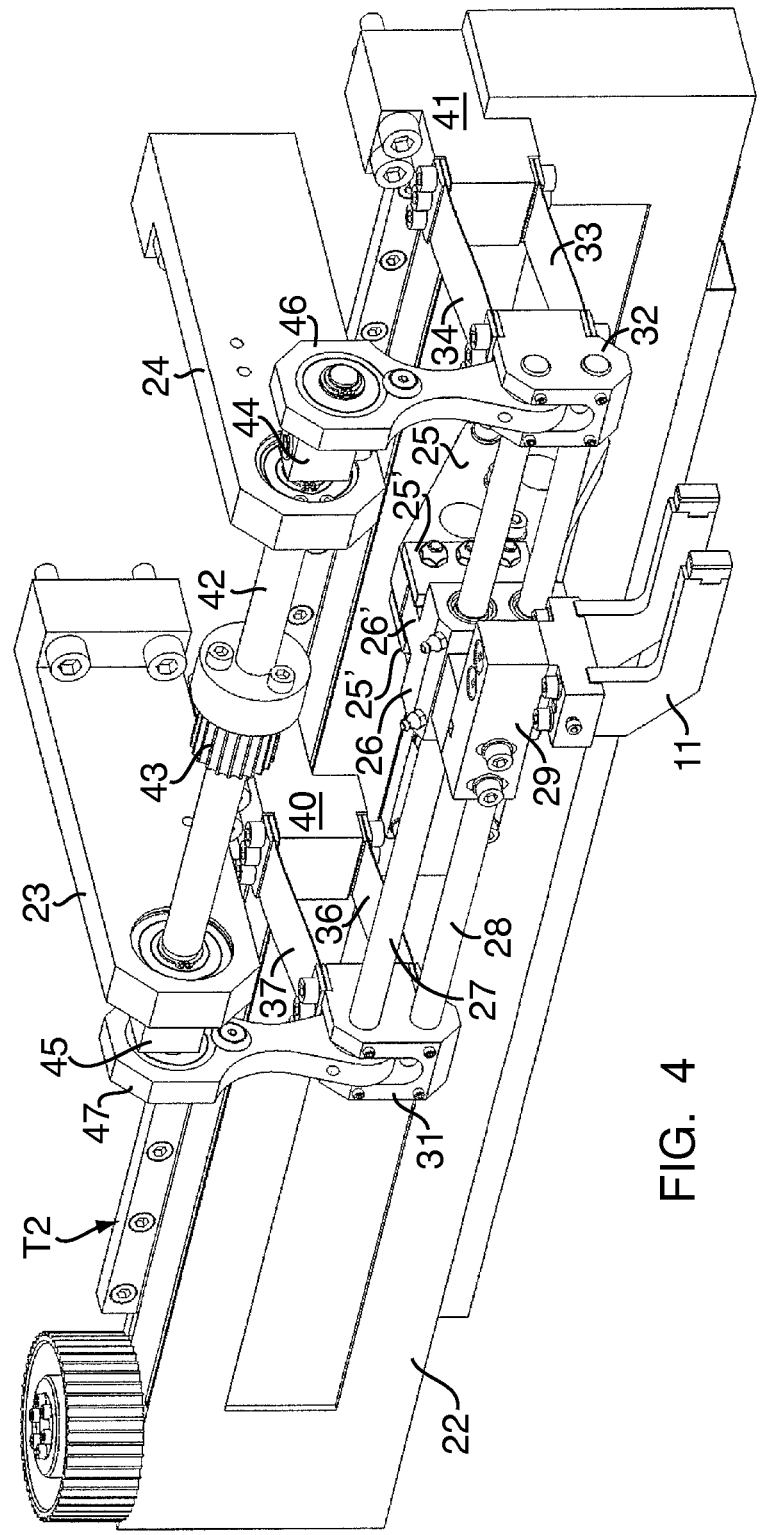
FIG. 4 shows a first embodiment of the second conveyor.

FIG. 4 shows a perspective of a first embodiment of the conveyor T2 which can work as described. This conveyor T2 comprises a linear drive unit 22 fixedly arranged on the apparatus (on its support) which is generally known to the man skilled in the art and is not detailed here further. On the sliding carriage, or on another part of the linear drive unit 22 which can be driven to and fro, an attachment 25 is fixed which transmits the carriage movement of the linear drive unit to a holder 26 which is guided on linear guides 27 and 28 and can be moved to and fro by the linear drive unit. This holder bears the conveying dog 11 via an intermediate piece 29. The dog 11 is preferably a dog with two fingers so that the body is conveyed without misalignment. The entrainment of the holder 26 by the linear drive unit is provided by two lateral plates 25' which are arranged on the attachment 25 and form a recess on the attachment 25 into which a nose 26' of the holder 26 extends. Thereby the holder 26 can be moved by the linear drive unit but may effect a vertical movement since the nose 26' can slide vertically between the holding plates 25'. Thereby the lifting an lowering of the conveying element 11 is possible by moving its holder 26 up and down together with its linear guides 27 and 28. These linear guides 27 and 28 are held in holding pieces 31 and 32, respectively, which are connected by leaf springs 36, 37 and 33, 34, respectively, to holding blocks 40 and 41 which are fixed on the conveying apparatus (here mounted on the non-moving part of the linear drive unit 22). The leaf springs 33 to 37 allow a vertical movement of the holding pieces 31, 32 and thereby of the conveying element 11. They do not, however, allow a movement transverse to the deflection of the leaf springs and thus no movement in the direction of the carriage movement of the linear drive unit. The deflection of the leaf springs and the holding pieces 31, 32 and accordingly of the conveying element 11 is caused by an eccentric drive having a driven shaft 42 which is supported in fixed bearing blocks 23 and 24. The shaft 42 is driven by a driving part (not shown) of drive 15 of the conveying apparatus or welding apparatus, respectively, which is shown in FIGS. 1 and 2 and which drive is controlled by control unit 3. In FIG. 4 only the toothed belt wheel 43 mounted on shaft 42 is shown which allows the driving of the shaft 42 by drive 15, for example by a servo-motor thereof via a toothed belt. At the ends of shaft 42 eccentric pieces 44 and 45 are provided which are connected via rods 46 and 47 with the holding pieces 32 and 31 for the up and down movement thereof according to the eccentricity provided by the pieces 44 and 45. Accordingly, the up and down or lifting and lowering, respectively, of the conveying element 11 is effected. The size and the material of the leaf springs is selected such that their maximum stress level is not exceeded in the upper and lower dead centre of the eccentric movement. By using several leaf springs arranged in parallel and in a given distance, the conveying element with its two dogs remains level. The leaf springs need no adjustment and do not wear. Instead of the leaf springs bendable holders with a joint may be provided but the simpler solution with leaf springs is preferred.

Figure 5:
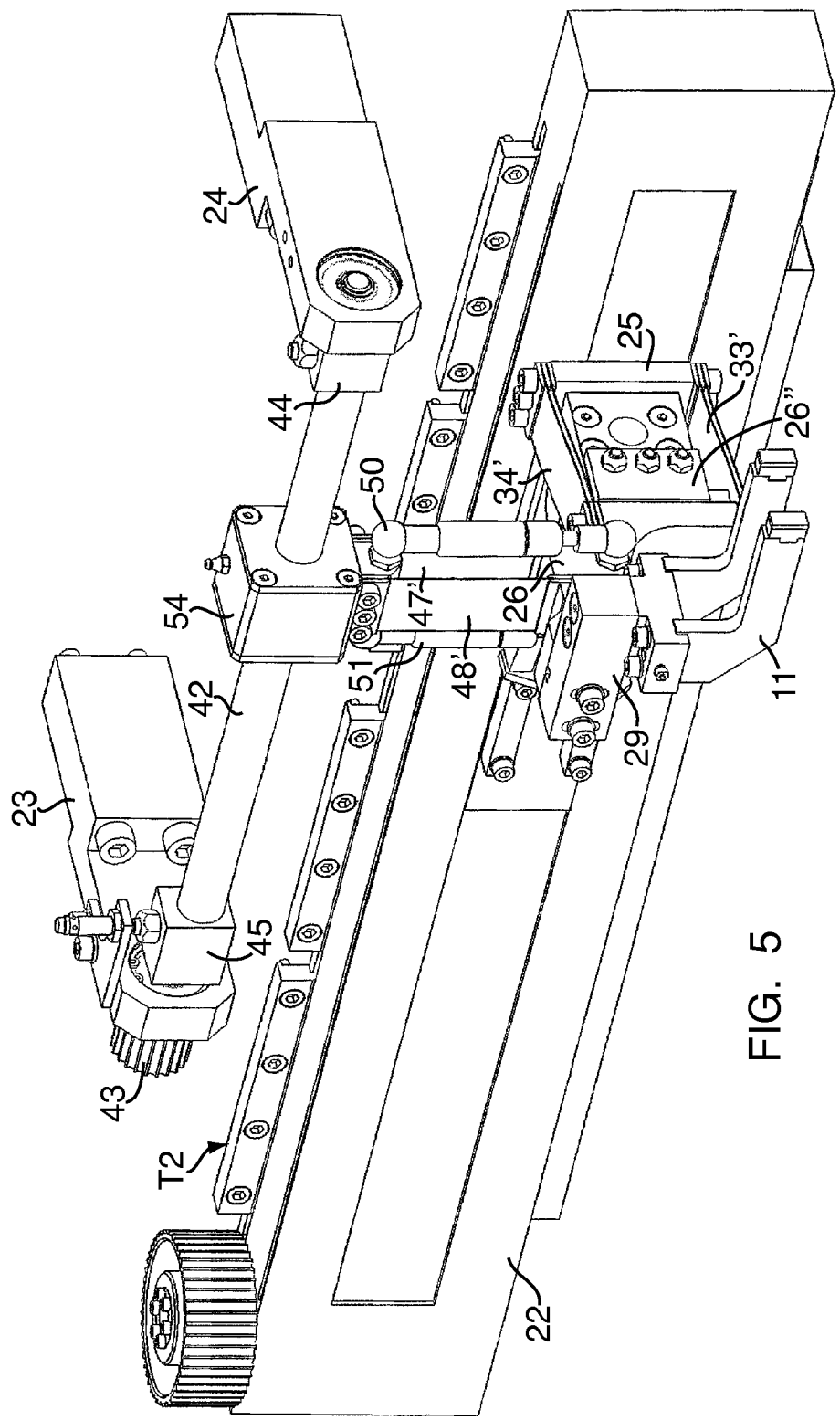
FIG. 5 shows another embodiment of the second conveyor.

FIG. 5 shows another embodiment of the second conveyor T2 wherein same reference numerals denote functionally equivalent elements. Again a linear drive unit 22 is provided that is fixed to the conveying apparatus or the welding apparatus, respectively. An attachment 25 is mounted on the carriage of the linear drive unit which effects the to and fro movement. Fixed bearing blocks 23 and 24 are provided as well. Eccentric pieces 44 and 45 are arranged on the bearings in bearing blocks 24 and 23 and can be driven by the lifting and lowering drive which is part of drive 15 and which is indicated by toothed belt wheel 43. Rotation of wheel 43 thus results in an up and down movement of the linear guide 42 and the bearing housing 54 arranged thereon in which a bearing is arranged that is movable radially and axially on the linear guide 42. The vertical movement is thus relayed to the conveying element 11 for lifting and lowering thereof, preferably by two leaf springs 47' and 48' which are arranged in parallel and in a distance to each other. A bending of the leaf springs 47' and 48' is avoided by spring elements 50 and 51 which pre-load the leaf springs. Holder 26 which bears the conveying element 11 by an intermediate piece 29 is driven by the linear driving unit via attachment 25. By plates 26", of which only the frontal plate can be seen in FIG. 5, holder 26 is vertically displaceable against attachment 25 and thus can be lifted and lowered by the drive and the eccentrically movable linear guide 42, respectively. Holder 26 and thus the conveying element 11 is laterally held in parallel by additional leaf springs 33' and 34' which are fixed to the attachment 25 of the linear drive unit.

Figure 6:
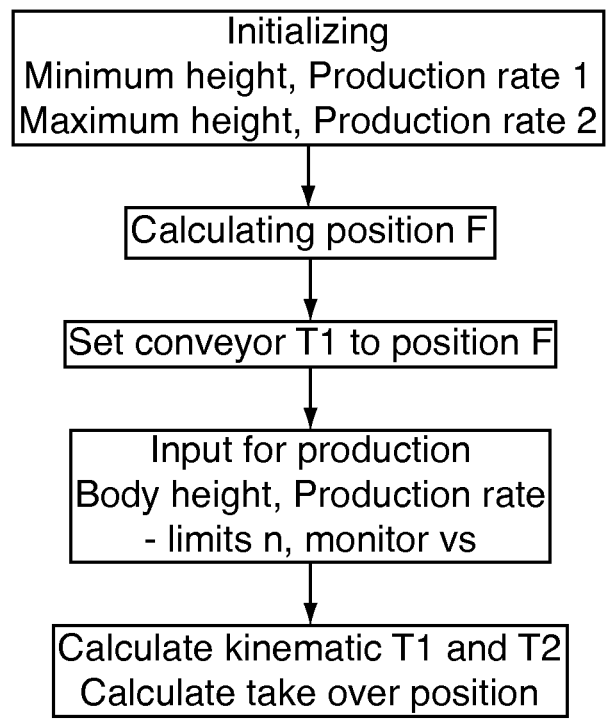
FIG. 6 shows a flowchart.

FIG. 6 shows a flow chart of the aspect of the invention wherein the take over position is determined, which is shown in the two last blocks of the flow chart. In the three preceding blocks an initialising of the welding apparatus 1 with the two conveyors T1 and T2 is done by inputting the minimum height and the maximum height of the bodies and the desired production rate. Afterwards the control unit 3 or an external computer calculates the distance F which allows to bring the conveyor T1 once in a defined position with regard to the welding plane. The conveyor T1 is then arranged accordingly. Following these initialising steps the calculation or the empirical determination of the taking over position and then the control of the take over and/or the determination of the conveying travel X occur, as has been described above.

According to the aspects of the invention a conveying apparatus with a first conveyor and a second conveyor is used in the welding apparatus between which conveyors the object to be welded is handed over. A control unit determines the take over position and/or the conveying travel of the second conveyor and controls the conveyors accordingly, so that the take over occurs at the determined position and/or with the determined conveying travel of the second conveyor. This allows an easy and swift changing of the welding apparatus to different sizes of the objects to be welded.

While there are shown and described presently preferred embodiments of the invention, it is to be distinctly understood that the invention is not limited thereto but may be otherwise variously embodied and practised within the scope of the following claims.

What is claimed is:

1. A welding apparatus for container bodies comprising:
    a rounding station for said bodies,
    a welding station having calibration tools and driven welding rollers, and
    a conveying apparatus for conveying said bodies from said rounding station into said welding station,
    wherein said conveying apparatus comprises a first controllable conveyor T1 having a first conveying path, a second controllable conveyor T2 having a second conveying path, and a control unit connected to controllable drives of said first controllable conveyor and said second controllable conveyor,
    wherein said conveying paths overlap partly in an overlapping zone,
    wherein a container body conveyed by said first controllable conveyor is taken over by said second controllable conveyor at a take over position in the overlapping zone, and
    wherein said take over position is determined by said control unit or determined externally, and
    wherein said control unit is configured and operable to effect said take over at said take over position during an operation of said welding apparatus.

2. The welding apparatus according to claim 1, wherein said take over position is dependent on the length of said conveying body in a conveying direction.

3. The welding apparatus according to claim 1, wherein said first controllable conveyor comprises an electrical servomotor drive comprising one of a chain conveyor comprising a chain and a belt conveyor comprising a belt with conveying elements arranged on said chain or said belt.

4. The welding apparatus according to claim 1, wherein said second controllable conveyor comprises a linear conveying unit with a single conveying element.

5. The welding apparatus according to claim 1, wherein said second controllable conveyor comprises a lifting and lowering unit by which a conveying element of said second controllable conveyor is driven for lifting and lowering of said conveying element at a desired controllable position along said second conveying path of said second controllable conveyor.

6. The welding apparatus according to claim 5, wherein said second controllable conveyor comprises a single conveying element.

7. The welding apparatus according to claim 3, wherein a conveying element of said second controllable conveyor is displaceable along a linear guide by a linear drive unit and said linear guide is arranged to be lifted and lowered by a lifting and lowering unit.

8. The welding apparatus according to claim 3, wherein a conveying element of said second controllable conveyor is arranged on a linear displaceable part of said second controllable conveyor, and wherein said conveying element is arranged to be lifted and lowered by a holding unit using elastically flexible holders or holders that bend at a joint.

9. The welding apparatus according to claim 8, wherein said elastically flexible holders are leaf springs.

* * * * *